United States Patent [19]

Stephens

[11] Patent Number: 5,023,117

[45] Date of Patent: Jun. 11, 1991

[54] NOVELTY ITEM AND METHOD OF MANUFACTURE

[76] Inventor: Kimetha L. Stephens, P.O. Box 1384, Danville, Ky. 40422

[21] Appl. No.: 465,504

[22] Filed: Jan. 16, 1990

[51] Int. Cl.$^5$ ............................................. A01N 3/00
[52] U.S. Cl. ........................................ 428/17; 2/175; 156/57; 427/4
[58] Field of Search ............... D2/248, 249, 250, 251, D2/252; 2/175, 177, 193; 426/104, 132; 446/386, 391; 156/57; 427/4; 428/15, 17

[56] References Cited

U.S. PATENT DOCUMENTS

| D. 12,894 | 4/1882 | Norse | 428/24 X |
| 1,638,480 | 8/1927 | Feybusch | 426/132 |
| 2,297,191 | 9/1942 | Parman | 362/123 X |
| 3,031,311 | 4/1962 | Nakagawa | 426/132 |
| 3,607,488 | 9/1971 | Yordan | 156/57 |
| 3,976,807 | 8/1976 | Sweeney et al. | 428/16 |
| 4,003,142 | 1/1977 | Morrison et al. | 428/16 X |
| 4,917,922 | 4/1990 | Allison et al. | 156/57 X |

*Primary Examiner*—Henry F. Epstein
*Attorney, Agent, or Firm*—Warren D. Flackbert

[57] ABSTRACT

A novelty item and method of manufacture which employs the usage of thin apple slices to decorate a form, such as a hat, a basket or whatever. The apple slices are each cut from the top to the bottom of the apple and remain unpeeled, and with core and seeds, to preserve realism. The sliced apples are arranged in layers during assembly of the item, where, typically, lemon juice, a preservative and an aromatic material, as well as some type of decoration, serve to enhance the finished product.

8 Claims, 1 Drawing Sheet

ITEM AND METHOD OF MANUFACTURE

As is known novelty items of various types create a great deal of consumer interest, where, in the instance herein, the novelty item may be broadly characterized as one kindred to arts and crafts. As further known, specialty shops oftentimes feature novelty items of a geographical area and/or region, such as those creating a certain atmosphere of the pioneer era, mountain craft and the like, also appropriate to the instant novelty item.

BACKGROUND OF THE INVENTION

The novelty item of the invention relies on the usage of apples as a part thereof and, accordingly, may include the term "apple" as part of its designation. Actually, the finished item may assume various configurations, depending upon the form utilized, as, for example, a hat based on woven straw or baskets of one shape or another.

The significant feature of the invention is the aforesaid apple usage, as in layers, and the importance of manufacturing such with a full consideration of time and material expended. Added importance in production lies in the drying of thinly cut apple slices (through the entire apple), where no peeling of apple skin is desired for added end realism.

The result is a uniquely appearing finished novelty item (where the method of manufacturing such will be detailed herebelow), and, at the outset, it should be further mentioned that the item, in various finished forms, has met with high consumer acceptance, based not only on presentation but, as well, durability in use.

BRIEF DESCRIPTION OF THE DRAWING

A better understanding of the present invention will become more apparent from the following description, taken in conjunction with the accompanying drawing, wherein.

Figure 1:
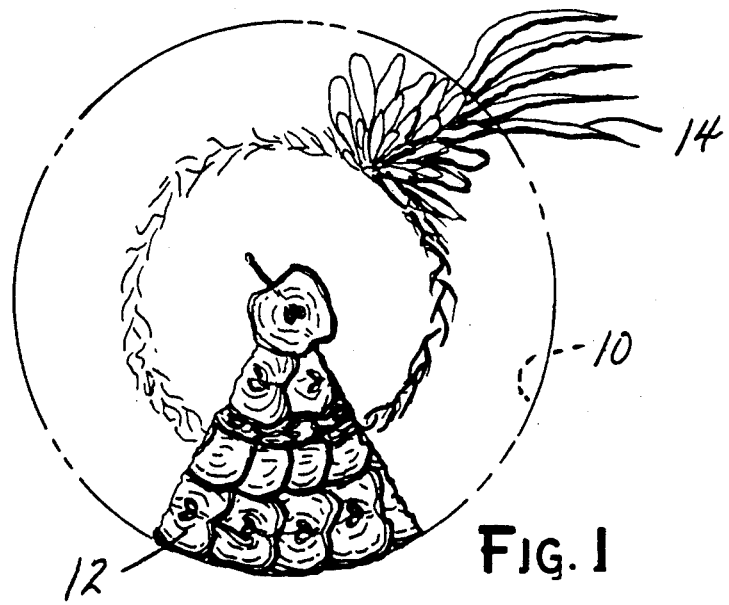
FIG. 1 is a top plan view showing a typical novelty item in accordance with the teachings of the present invention.
Figure 2:
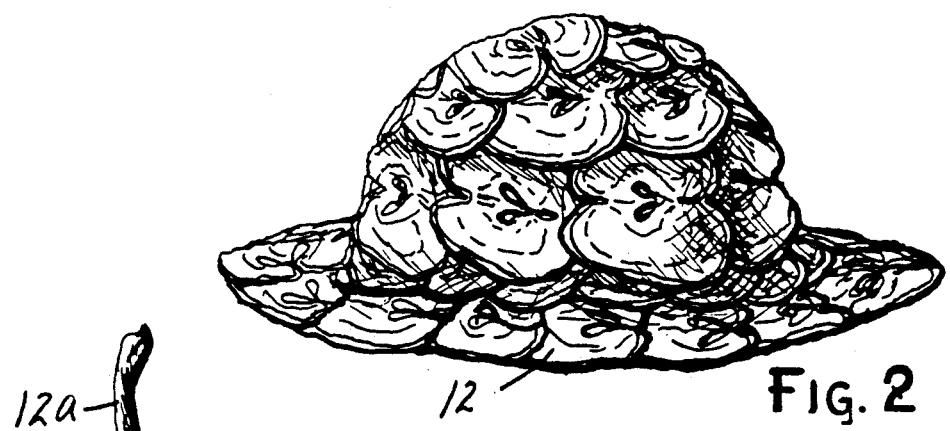
FIG. 2 is a view in side elevation of the novelty item of FIG. 1, looking in the direction of arrows 2—2 on such figure; and, FIG. 3 is a detailed view of a single apple slice used in accomplishing the finished item of FIGS. 1 and 2.
Figure 3:
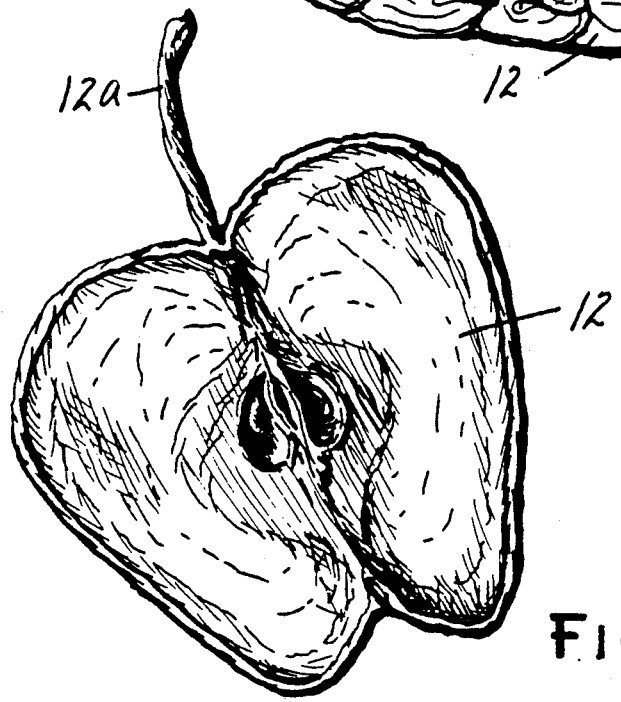

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the novelty item illustrated herein assumes the form of a hat typically having a woven straw base 10, where such includes not only the layered apple slices 12 but, as well, any desired ornamentation 14 to further enhance the total visual presentation. It should be noted that, where possible, the apple slices 12 are not only layered, but, as well, layered flat (horizontally). Obviously, the need to use bits, pieces or chunks of apples may be necessary because of the particular novelty item involved, but, basically, the layered flat disposition of apple slices 12 is preferred.

In the method of manufacture, a volume of whole apples is sliced (to a thickness approximating ⅛"), with no peeling of apple skin, and includes slices through the entire apple, i.e. through the skin and the core in the direction of stem 12a (from apple top to bottom), where the skin, the core and the seeds add further realism to the assembled item. Lemon juice is then applied to the apple slices 12, where such, thereafter, are dehydrated, preferably by air drying, as necessary (about eight hours, for example).

After the dehydrated apple slices 12 have concluded the dehydration period, signified by looseness in the moving ability of each apple slice 12, the inside or concealed surface of each apple slice 12 is dotted with an amount of hot glue (not shown), as through the use of a conventional hot glue gun. The apple slices 12 are then arranged on a form (as a hat crown) and, as stated, in generally flat layers.

After the arranging has been accomplished, a preservative, as a lacquer finish spray (or even polyurethane) is applied, with sufficient time, as one hour, allowed for drying. At this time, an aromatic substance, such as cinnamon oil (or other potporrie), may be applied to add further realism to the item, followed by the application, if deemed needed, of ornamentation, such as a ribbon, a trace of flowers, some foliage or the like.

The finished item is quite unique in appearance, and includes the added factor of durability for the user. The latter has particular significance, depending upon the form in which the item is presented, as, for example, a basket which might serve more than ornamental purposes.

The novelty item, and the method of manufacture thereof, described hereabove is susceptible to various changes within the spirit of the invention, including, by way of example, and as already stated, a variety of forms which the finished item may assume; the cutting of the apple into slices other than from the preferred top to bottom of the apple, i.e. in planes parallel with the direction of the apple stem; the particular type of glue employed, as well as the precise preservative and aromatic materials; and, the like.

Thus, the preceding should be considered illustrative and not as limiting the scope of the following claims

I claim:

1. A novelty item comprising a form serving as a foundation, a plurality of dehydrated apple slices arranged in layers on said form, adhesive means securing said apple slices to each other and to said form, and wherein said assembled layers of apple slices have been sprayed with a preservative.

2. The novelty item of claim 1 where each apple slice in a layer of apple slices is relatively thin and representative of a total slice through the skin and the core thereof.

3. The novelty item of claim 2 where each apple slice is parallel with the direction of the apple stem.

4. The novelty item of claim 1 where said layers of sliced apples are substantially flat.

5. The method of manufacturing a novelty item including a form serving as a foundation and an arrangement of sliced apples on said form which comprises the steps of taking a whole apple and thinly slicing such completely therethrough, applying lemon juice to an area of sliced apples and then dehydrating said sliced apples, arranging said dehydrated sliced apples on said form in layers, applying an adhesive to the undersurface of each apple slice for securement thereof with each other and with said form, and spraying said assembled layers of apple slices with a preservative.

6. The method of claim 5 where the step of thinly slicing said apples completely therethrough includes a path through the apple skin and the apple core parallel with the direction of the apple stem.

7. The method of claim 5 where a further step includes the spraying of an aromatic substance on said layers of arranged apple slices.

8. The method of claim 5 where a further step includes the adding of ornamentation onto said layers of arranged apple slices.

* * * * *